Figure 1:
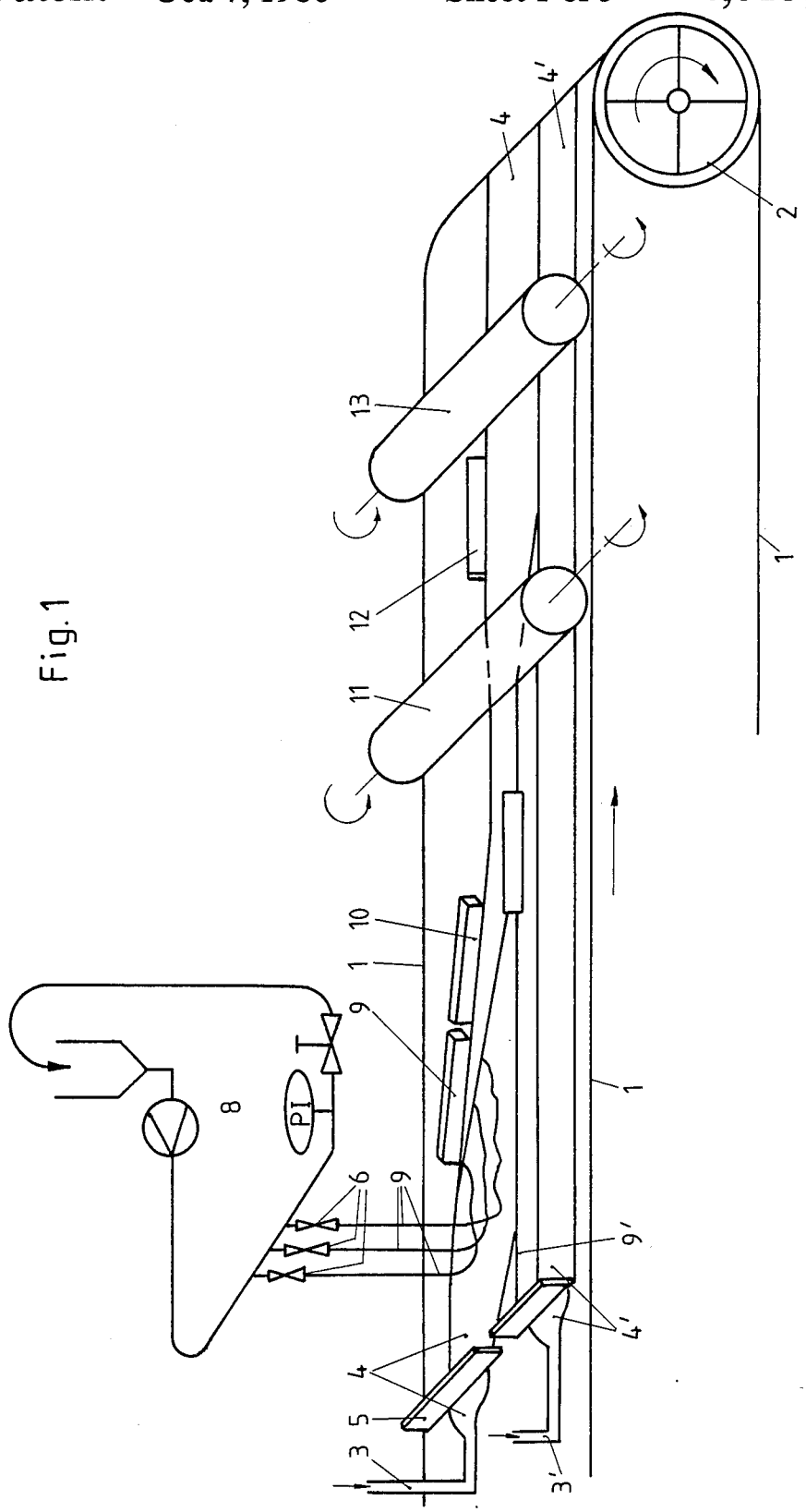

United States Patent [19]

Vilchez et al.

[11] Patent Number: 4,615,890

[45] Date of Patent: Oct. 7, 1986

[54] METHOD OF CONSTRUCTING A PLASTIC ROPE TO BE INTRODUCED INTO A CONICAL ROLLER OR SIMILAR MECHANISM IN THE MANUFACTURE OF HARD BONBONS WITH A STRATIFIED CORE

[75] Inventors: José Vilchez, Hanover; Reinhard Mergelsberg, Garbsen; Jürgen Schlüter, Feggendorf; Harmut Hagen, Elze, all of Fed. Rep. of Germany

[73] Assignee: Otto Hänsel GmbH, Hanover, Fed. Rep. of Germany

[21] Appl. No.: 624,713

[22] Filed: Jun. 26, 1984

[30] Foreign Application Priority Data

Jun. 30, 1983 [DE] Fed. Rep. of Germany ....... 3323551

[51] Int. Cl.[4] ............................................. A23G 3/00
[52] U.S. Cl. .................................. 426/297; 426/103; 426/307; 426/660; 425/90
[58] Field of Search ............... 426/302, 305, 307, 297, 426/272, 500, 501, 282, 283, 284, 660, 103

[56] References Cited

U.S. PATENT DOCUMENTS 4,357,359 11/1982 Cloud et al. ...................... 426/660

OTHER PUBLICATIONS

Montagné, 1961, Larousse Gastronomique Crown Publishers, Inc., NY, p. 152.

Primary Examiner—Raymond N. Jones
Assistant Examiner—Carolyn Paden
Attorney, Agent, or Firm—Max Fogiel

[57] ABSTRACT

The invention concerns a method of constructing a plastic rope used in the manufacture of hard bonbons with a stratified core that is made out of multiple layers of plastic sugar and plastic filling. The ropes are brought independently of one another to a predetermined thickness and width. Plastic filling is constantly applied to at least one of the ropes and rolled into it from the side in such a way as to produce a tube that is closed into itself and that, after being dimensioned, is pushed along laterally into the rope of plastic coating with the edges overlapping in such a way that they adhere together. The accordingly prepared ropes are then introduced together into a rope shaper (conical roller), stretched farther horizontally if necessary, and supplied to the cutting machine.

5 Claims, 3 Drawing Figures

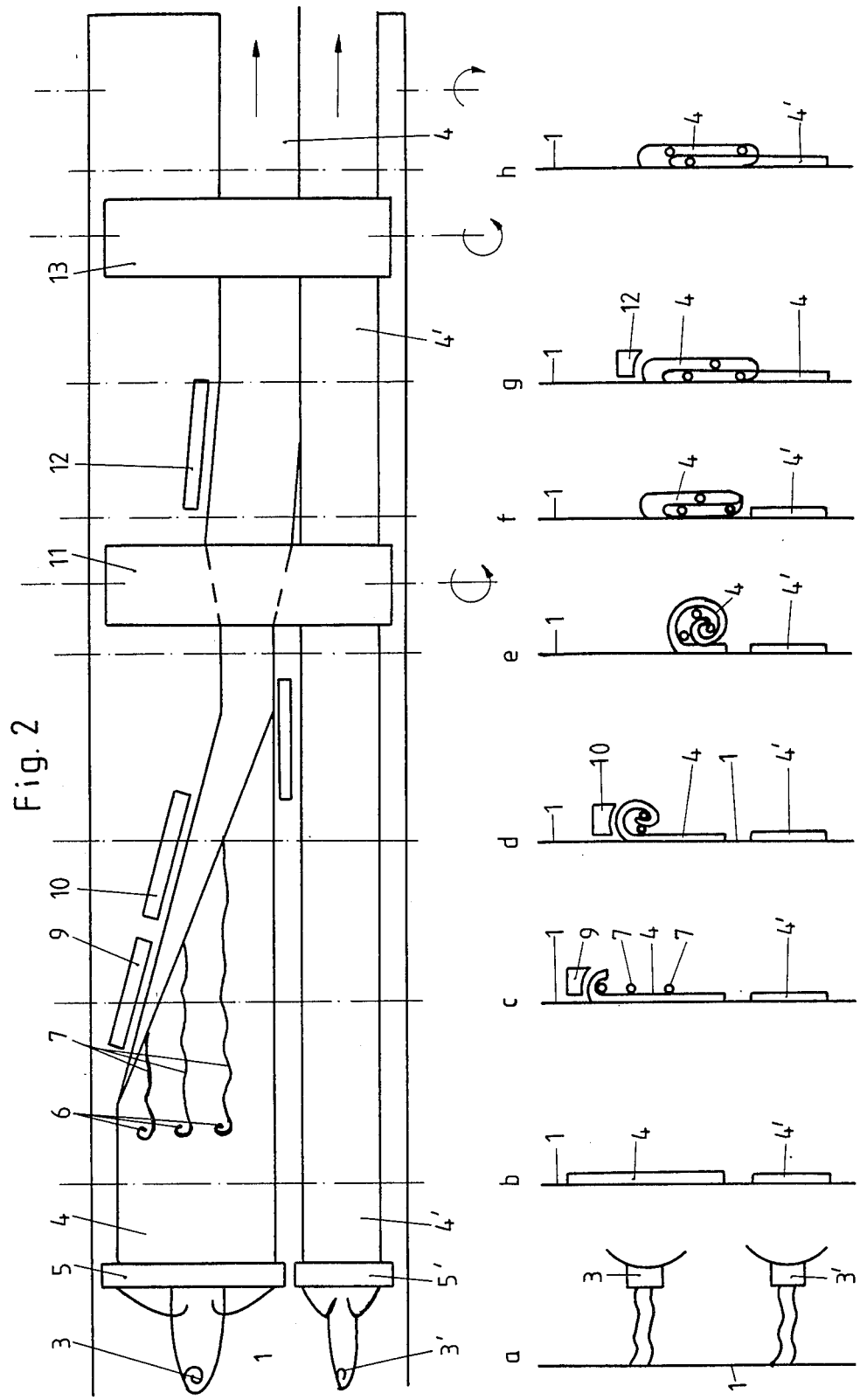

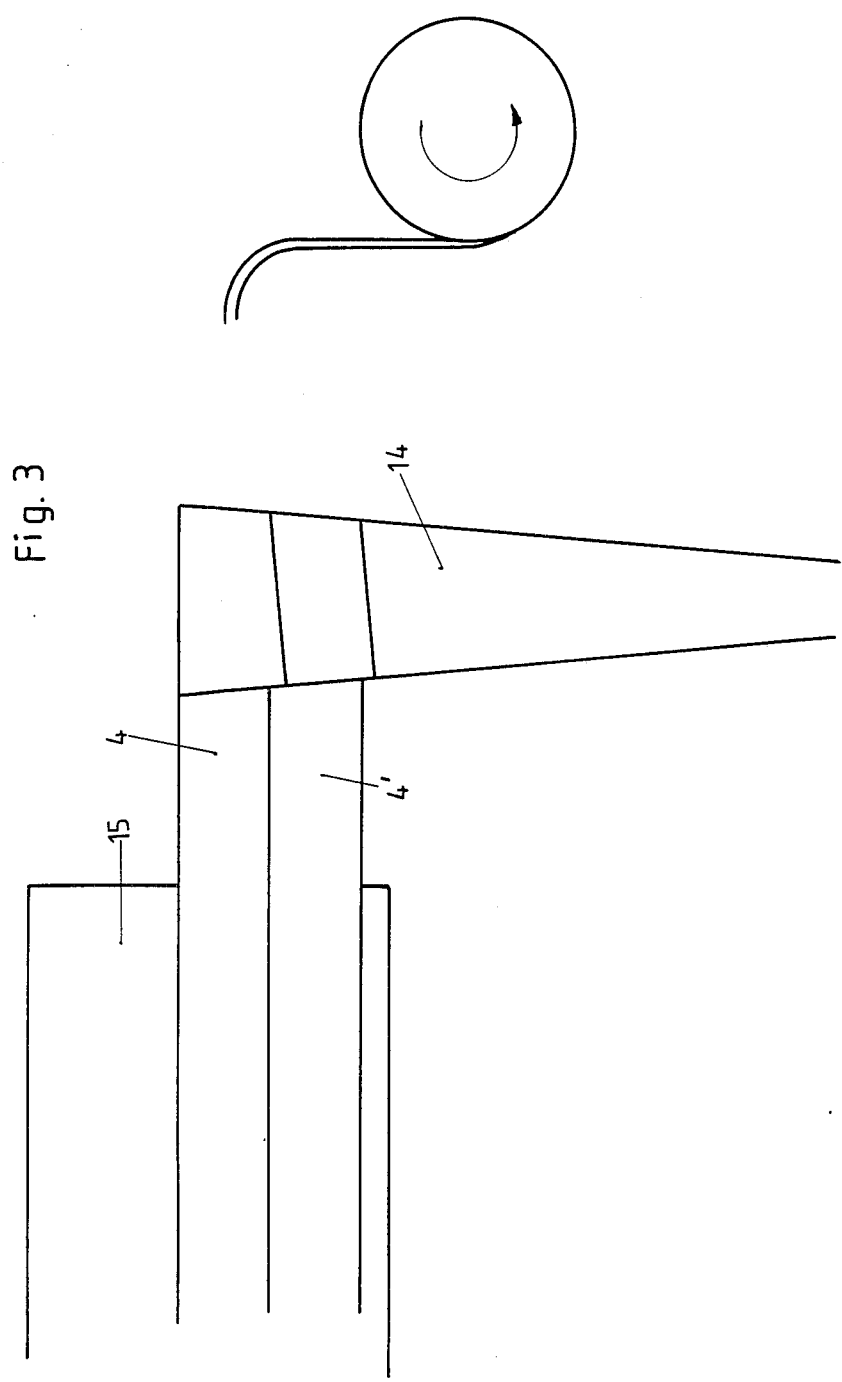

METHOD OF CONSTRUCTING A PLASTIC ROPE TO BE INTRODUCED INTO A CONICAL ROLLER OR SIMILAR MECHANISM IN THE MANUFACTURE OF HARD BONBONS WITH A STRATIFIED CORE

This invention concerns a method of constructing a plastic rope to be introduced into a conical roller or similar mechanism in the manufacture of hard bonbons with a stratified core that is made out of multiple layers of plastic sugar and plastic filling and also discloses a device intended for carrying out the method. Production has until now consisted of diverting and tempering the portion of a batch of boiled sugar necessary for the coating of the bonbon. The remaining plastic sugar is aerated in mechanically operating pulling machines and then pulled on a heated table into a usually rectangular surface. The desired amount of plastic filling is spread uniformly over this surface and the resultingly coated plastic sugar folded in such a way that the filling is completely enclosed in the sugar. Further pulling back to the initial dimensions subsequent to folding decreases the thickness of the layers of sugar and filling, and this can be repeated as often as desired by continued folding and pulling. The result is a corresponding number of layers of sugar and filling, which must be definitely separate from each other and should be pulled out as thin as possible. The resultingly stratified batch of sugar is then inserted into a previously prepared plastic coating that has been pulled into a rectangular surface and sealed in continuously on all sides. The total batch of sugar, consisting of coating and stratified mass, is then placed in a conical roller, pulled to the thickness of the bonbon rope and cut into individual bonbons.

This method is, however, very labor intensive because it must be carried out batchwise and requires corresponding personnel to prepare the coating and stratified mass.

The completely continuous manufacture of hard bonbons with a stratified core by means of the applicant's Sucroliner-brand hard-sugar producing layout, of a downstream conveyor belt, and of a stand-alone Stradabrand hard-candy cutting production line is also known from the in-house state of the art. Still, this system either does not adequately eliminate the aforesaid drawbacks or demands the application of extensive mechanical devices.

The object of the present invention is to eliminate the aforesaid drawbacks and to provide a method and device that allows continuous manufacture of hard-sugar bonbons at minimal engineering expense and maximal output.

This object is attained in accordance with the invention in that several ropes of plastic sugar are placed parallel to and without contacting one another on a continuously traveling tempering belt. At least one rope is intended to constitute the coating and at least one other rope is to accommodate the plastic filling. The ropes are brought independently of one another to a predetermined thickness and width. Plastic filling is constantly applied to at least one of the ropes to be stratified and rolled into it from the side in such a way as to produce a tube that is closed into itself. After being dimensioned, the tube is pushed along laterally into the rope of plastic coating with the edges overlapping in such a way that they adhere together. Subsequently the accordingly prepared ropes are introduced together into a rope shaper (conical roller), stretched farther horizontally if necessary, and supplied to the cutting machine.

A device with a tempering belt, over which plastic sugar deriving from a supply device is supplied in the form of a rope to a conical roller and to a cutting machine, for carrying out this method is characterized in that the belt is wide enough to convey several separated adjacent ropes of plastic sugar at the same time, in that several sites for the supply of plastic sugar are located next to one another at the commencement of the path traveled by the belt, with tools for rolling out or shaping the adjacent ropes of plastic sugar into ropes, with filling-application nozzles, and with baffles or the like for shaping the strips of sugar coated with filling into a roll enclosing the filling, all positioned downstream of the sugar-supply sites and in that tools for laterally pushing together at least one stratified rope and one rope of plastic coating mass in such a way that the edges overlap and for simultaneously introducing the accordingly adhering ropes into a conical roller or the like are positioned along the remainder of the path traveled by the belt.

The system can of course be varied in a large number of ways. A rope of plastic sugar that is itself stratified can for example also be employed as a coating. The coating and stratified mass can also be introduced superimposed into the conical roller, Finally, it is also possible to employ the device in accordance with the invention to advance more than two ropes of plastic coating or more than two stratified ropes through the plant simultaneously. What is of particular significance is that several ropes of sugar that differ in recipe and proportion can be employed positioned on the same tempering belt. Furthermore, the individual ropes can be independently shaped into any desired thicknesses and widths.

The theory behind the invention allows the widest possible range of embodiments. One of them will now be described with reference to the attached drawings, in which FIG. 1 is a perspective view of the initial section of a tempering belt, FIG. 2 is a top view of the same section of the belt, with details a–h being sections through the belt and through the ropes of plastic sugar illustrating the various stages in shaping them, and FIG. 3 is a schematic representation of the point at which the ropes enter the conical roller.

In manufacturing hard bonbons, a stratified core is produced from multiple layers of plastic sugar and plastic filling. The core can account for up to more than 50% by volume. A thin layer of sugar completely surrounds the core. Conventionally, the components of the stratified mass are pulled or aerated or unaerated masses and pasty to liquid fillings, preferably based on fat, that lie alternately one on top of another.

An essential component of the manufacturing device is a continuous tempering belt 1, preferably a metal belt that travels over rollers 2 and has an operative section about 10 m long in which the masses that it carries can be, in particular, heated, although also cooled. Ropes 4 or 4' of plastic sugar are applied to the belt from various supply devices 3 or 3' that communicate with sugar boilers. The ropes travel along with the continuously moving belt. Both ropes of sugar are supplied parallel to and separated from each other. The masses of sugar can differ in both recipe and quantity as desired. Proportioning devices 5 or 5' establish the thickness and width of each mass of sugar independently.

Two ropes of plastic sugar are employed in the embodiment illustrated by way of example. The rope 4' on the right in the direction traveled by tempering belt 1 is preferably employed unaerated to construct the coating. The rope 4 on the left on the other hand is continuously aerated and covers a wider area. It is covered, after traveling a certain stretch, with three for example ropes of a pasty filling 7 from a system 6 of nozzles positioned above tempering belt 1. Filling 7 derives from a preparation system 8. It is of course possible for the individual portions of filling to differ in proportion, type, or flavor. The two ropes of plastic sugar can also of course be interchanged, with the rope of plastic coating being on the left and the rope of filling on the right.

The filling is applied through one or more nozzles 6, through which the masses of filling are applied to the plastic-sugar coating in the form of ropes, with the interval between them being variable. Specially designed baffles 9 or 10 close the sugar coating on belt 1 laterally into a narrow roll, with each strip of filling being rolled in separately and the filling finally being surrounded with sugar on all sides.

This produces a completely closed tube with spiral layers of filling and sugar introduced into it in accordance with the number of filling nozzles 6. The tube is rolled into its final thickness with a dimensioning roller 11 and applied laterally in steps to the parallel unaerated rope 4' of coating by means of guides 12 and a roller 13. Both ropes 4 or 4' of plastic sugar are applied together with the edges overlapping in such a way as to make them adhere. Both ropes travel together, dimensioned in height and width, over a delivery belt 15 at the end of the tempering and cutting section with the coating mass precisely positioned in relation to the stratified mass.

Both masses are rolled out in a conical roller 14 and pulled horizontally by a pulling machine to further decrease the thickness of the individual layers, which are constantly surrounded by a constantly thinner coating. The finally dimensioned rope of sugar with its stratified core is supplied to the cutting machine, in which it is separated into individual bonbons that are subsequently cooled. The cooled bonbons correspond to the aforesaid operation with respect to stratification effect and uniformity. The sections labeled a–h will make each step of the operation described herein especially evident.

We claim:

1. Method of constructing an edible plastic rope to be introduced into a conical roller or similar mechanism in the manufacture of hard bonbons with a stratified core having multiple layers of edible plastic sugar ropes and edible plastic filling, comprising the steps of: forming said ropes independently of one another and dimensioning said ropes to a predetermined thickness and width; constantly applying a plastic filling to at least one of the ropes to be stratified and rolling it from a side to produce a tube that is closed into itself by bending longitudinal edges of the rope upwards and inwardly; dimensioning said tube and pushing said tube laterally into an adjacent rope of plastic coating so that the edges overlap and adhere together; introducing thereafter the ropes prepared by said aforementioned steps into a rope shaper, stretching said ropes horizontally if necessary; and supplying said ropes to a cutting machine for cutting said tube into individual pieces.

2. Method defined as in claim 1, wherein more than one rope of edible plastic coating mass or rope of edible plastic stratified mass is applied to a tempering belt.

3. Method defined in claim 1, wherein said rope of plastic coating is also stratified.

4. Method as defined in claim 1, wherein said rope of plastic coating and said rope of stratified mass are introduced one directly on top of the other into said rope shaper.

5. Method as defined in claim 1, wherein several ropes of filling mass are applied to a common ribbon of plastic sugar; and rolling in simultaneously the strips of filling separate from each other.

* * * * *